UNITED STATES PATENT OFFICE.

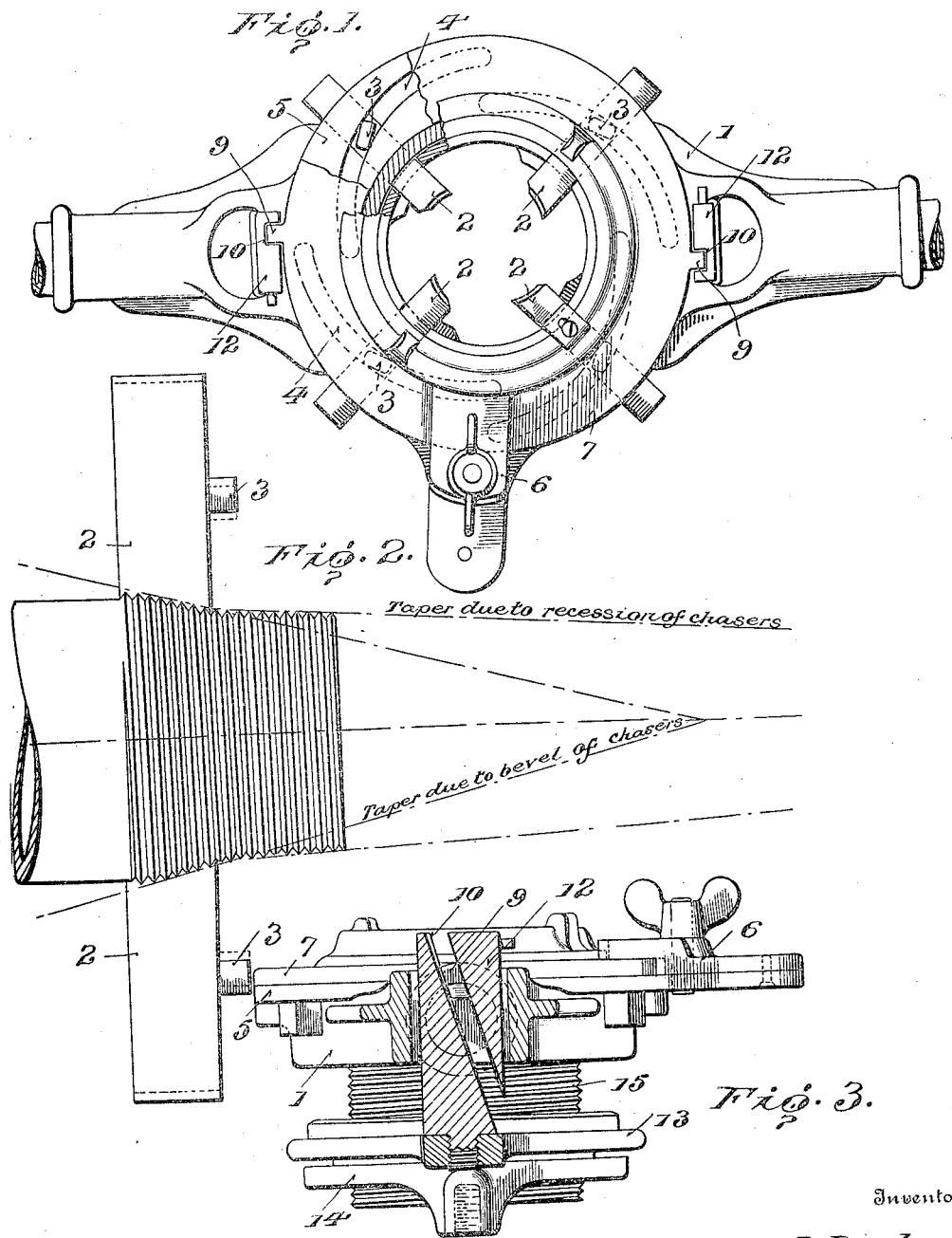

BRADFORD BORDEN, OF WARREN, OHIO, ASSIGNOR TO THE BORDEN COMPANY, OF WARREN, OHIO, A CORPORATION OF OHIO.

TAPER-THREAD-CUTTING TOOL.

No. 875,043.　　　　　Specification of Letters Patent.　　　　　Patented Dec. 31, 1907.

Application filed December 19, 1906. Serial No. 348,649.

*To all whom it may concern:*

Be it known that I, BRADFORD BORDEN, of Warren, in the county of Trumbull and State of Ohio, have invented certain new and useful Improvements in Taper-Thread-Cutting Tools; and I do hereby declare the following to be a full, clear, and exact description of the invention, such as will enable others skilled in the art to which it appertains to make and use the same.

In cutting taper threads on pipes by causing the chasers to gradually recede during the cutting operation, ordinarily that tooth of each chaser which first engages the pipe performs practically all the cutting, the remaining or forward teeth doing little or no work. Heretofore the bevel of the cutting face of each chaser has corresponded to the ratio of recession of the chasers, and to this fact is due the difficulty above noted. I have found that by beveling the cutting face of each chaser to a degree greater than the taper desired on the thread of the pipe, or, in other words, to a degree greater than the ratio of recession of the chasers, I am enabled to utilize each tooth of each chaser in cutting away the material in the formation of the thread. Furthermore, by employing chasers with the bevel of their cutting faces greater than the taper which is to be imparted to the thread, I am enabled to cut a compound thread, or, in other words, a thread of two different tapers.

Therefore, the primary object of my present invention is to so form the chasers that each tooth thereof will perform an equal amount of work in cutting a thread, and at the same time enables me, in a single operation, to cut a compound thread, or one with a double taper.

The invention will be hereinafter fully set forth and particularly pointed out in the claims.

In the accompanying drawings, Figure 1 is an elevation of a threading tool. Fig. 2 is an enlarged diagrammatic view of two chasers and a pipe with a thread of double taper. Fig. 3 is a side elevation of the device shown in Fig. 1, with parts in section.

In the drawings, I have shown a die stock having the general characteristics of that embodied in an application for patent, Serial No. 341,763, filed November 2, 1906, and shall describe only so much thereof as is necessary to an understanding of the present invention. Within radial guideways in the die stock housing 1 are located a series of radial chasers 2 whose lugs 3 project into eccentric slots 4 of a circular chaser-engaging plate 5, which latter is locked by a clamp 6 to an outer similar plate 7 carrying diametrically-opposed lugs 9 which extend into the obliquely-arranged guideways 10 of posts 12, which posts project from a ring 13 axially movable on the outside of an interiorly threaded work-holder 14. As pointed out in said application, the posts 12 revolve with the die stock as the exteriorly threaded sleeve 15 of the latter travels inwardly in the work-holder, such movement effecting the gradual recession of the chasers and the formation of a taper thread.

According to my present invention, the cutting face of each chaser is beveled to a degree greater than the taper of the thread to be cut by the chasers during recession. In this way, each tooth of each chaser will perform its allotted degree of work, and the entire cutting is not thrown upon the innermost or first tooth, as has heretofore been the case where the bevel of the chasers corresponds to the taper of the thread. Of course, the degree of the latter taper depends upon the ratio of recession, and this is controlled, in a tool of the character shown, by the pitch of the diagonal guideways of the posts. But regardless of the pitch of such guideways, by having the bevels of the chasers greater than the taper of the thread, and, in consequence, greater than the pitch of the diagonal guideways, each cutting tooth will perform its duty.

The taper of the portion threaded by the several teeth of several chasers (irrespective of the cutting during recession) corresponds to the bevels of the cutting faces of the chasers. This taper is, of course, reduced as the cutting progresses, the chasers recede, and the outward teeth cut into the threads formed by the inner teeth. If the cutting operation be discontinued when the chasers cease to recede, or at any point short of the full limit of their recession, there will be on the pipe a thread of double taper.

The advantages of my present invention are manifest. The cutting edges of the chasers will last longer and not dull as quickly as heretofore, since each tooth performs its full share of work. Another advantage resides in the fact that the chasers have a tendency to center on the pipe, enabling a second taper thread to be cut. This insures a tight-joint, especially when there is excessive variation in the tap gage of fittings.

I claim as my invention:

In a pipe threading device, a series of radially-arranged chasers, and means for allowing the chasers to recede during the cutting operation, the cutting face of each chaser being beveled to a degree greater than the ratio of recession of such chasers.

In testimony whereof, I have signed this specification in the presence of two subscribing witnesses.

BRADFORD BORDEN.

Witnesses:
ELLEN G. MURRAY,
M. W. BECHTEL.